United States Patent
Meyers et al.

(10) Patent No.: US 7,828,432 B2
(45) Date of Patent: Nov. 9, 2010

(54) HYBRID CONTACT LENSES PREPARED WITH EXPANSION CONTROLLED POLYMERIC MATERIALS

(75) Inventors: William E. Meyers, Scottsdale, AZ (US); Hermann H. Neidlinger, San Jose, CA (US); Ramazan Benrashid, Concord, NC (US); Ali Dahi, Carlsbad, CA (US); Jenny Xuan Huynh, San Bernardino, CA (US); Joseph Collins, Carlsbad, CA (US)

(73) Assignee: Synergeyes, Inc., Carlsbad, CA (US)

( * ) Notice: Subject to any disclaimer, the term of this patent is extended or adjusted under 35 U.S.C. 154(b) by 276 days.

(21) Appl. No.: 11/754,221

(22) Filed: May 25, 2007

(65) Prior Publication Data
US 2008/0291391 A1     Nov. 27, 2008

(51) Int. Cl.
  *G02C 7/04* (2006.01)
(52) U.S. Cl. .................. 351/160 H; 351/177
(58) Field of Classification Search ............. 351/160 H, 351/160 R, 177
  See application file for complete search history.

(56) References Cited

U.S. PATENT DOCUMENTS

| | | | |
|---|---|---|---|
| 2,240,157 | A | 4/1941 | Gagnon et al. |
| 3,228,741 | A | 1/1966 | Becker |
| 3,594,074 | A | 7/1971 | Rosen |
| 3,808,178 | A | 4/1974 | Gaylord |
| 3,808,179 | A | 4/1974 | Gaylord |
| 3,876,581 | A | 4/1975 | Neogi |
| 3,931,373 | A | 1/1976 | Beattie |
| 3,933,411 | A | 1/1976 | Winner |
| 3,944,347 | A | 3/1976 | Barkdoll et al. |
| 3,973,838 | A | 8/1976 | Page |
| 4,093,361 | A | 6/1978 | Erickson et al. |

(Continued)

FOREIGN PATENT DOCUMENTS

EP     1014156     6/2000

(Continued)

OTHER PUBLICATIONS

International Search Report in PCT Application PCT/US2006/014950, mailed Jul. 25, 2006.

(Continued)

*Primary Examiner*—Scott J Sugarman
(74) *Attorney, Agent, or Firm*—Knobbe, Martens, Olson & Bear, LLP (57) ABSTRACT

A hybrid contact lens includes a substantially rigid center portion and a substantially flexible skirt portion connected to the center portion. The skirt portion is formed using xerogels compatible with diluents comprising at least one selected from polylactic acid, polyglycolic acid, lactide, glycolide, a polyacetal, a cyclic acetal, a polyketal, a cyclic ketal, a polyorthoester, a cyclic orthoester, di-t-butyl-dicarbonate, tris(trimethylsilyl)amine, and 2,2,2-trifluoroacetamide. These diluents are formulated to function as a stand-in for water in the xerogel polymer, allowing the xerogel to form and bond to the rigid center portion in its fully expanded state. Upon hydration of the hybrid lens, substantially little dimensional change, and thus substantially little distortion, is obtained in the skirt portion. The diluents of the present invention further preserve the mechanical integrity of the xerogel, allowing the xerogel to be machined to final shape, improving the dimensional tolerances which can be achieved in the hybrid lens.

48 Claims, 1 Drawing Sheet

U.S. PATENT DOCUMENTS

| | | | |
|---|---|---|---|
| 4,109,070 A | 8/1978 | Loshaek et al. |
| 4,121,885 A | 10/1978 | Erickson et al. |
| 4,136,250 A | 1/1979 | Mueller et al. |
| 4,152,508 A | 5/1979 | Ellis et al. |
| 4,153,645 A | 5/1979 | Lanza |
| 4,166,255 A | 8/1979 | Graham |
| 4,171,878 A | 10/1979 | Kivaev et al. |
| 4,182,822 A | 1/1980 | Chang |
| 4,193,671 A | 3/1980 | Erickson et al. |
| 4,208,362 A | 6/1980 | Deichert et al. |
| 4,208,365 A | 6/1980 | LeFevre |
| 4,228,269 A | 10/1980 | Loshaek et al. |
| 4,242,483 A | 12/1980 | Novicky |
| 4,243,790 A | 1/1981 | Foley, Jr. |
| 4,248,989 A | 2/1981 | Novicky |
| 4,259,467 A | 3/1981 | Keogh et al. |
| 4,261,875 A | 4/1981 | LeBoeuf |
| 4,327,202 A | 4/1982 | Foley, Jr. |
| 4,420,228 A | 12/1983 | Humphrey |
| 4,424,328 A | 1/1984 | Ellis |
| 4,440,918 A | 4/1984 | Rice et al. |
| 4,463,149 A | 7/1984 | Ellis |
| 4,495,313 A | 1/1985 | Larsen |
| 4,528,301 A | 7/1985 | Upchurch |
| 4,543,398 A | 9/1985 | Bany et al. |
| 4,578,504 A | 3/1986 | Hammar |
| 4,582,884 A | 4/1986 | Ratkowski |
| 4,594,401 A | 6/1986 | Takahashi et al. |
| 4,604,479 A | 8/1986 | Ellis |
| 4,611,039 A | 9/1986 | Powell et al. |
| 4,625,007 A | 11/1986 | Ellis et al. |
| 4,638,040 A | 1/1987 | Hammar |
| 4,661,573 A | 4/1987 | Ratkowski et al. |
| 4,680,336 A | 7/1987 | Larsen et al. |
| 4,686,267 A | 8/1987 | Ellis et al. |
| 4,701,288 A * | 10/1987 | Cook et al. ................ 264/1.38 |
| 4,702,574 A | 10/1987 | Bawa |
| 4,711,943 A | 12/1987 | Harvey, III |
| 4,732,715 A | 3/1988 | Bawa et al. |
| 4,740,533 A | 4/1988 | Su et al. |
| 4,769,431 A | 9/1988 | Ratkowski et al. |
| 4,787,732 A | 11/1988 | Siviglia |
| 4,814,402 A | 3/1989 | Nakashima et al. |
| 4,818,801 A | 4/1989 | Rice et al. |
| 4,826,889 A | 5/1989 | Ellis et al. |
| 4,826,936 A | 5/1989 | Ellis |
| 4,837,289 A | 6/1989 | Mueller et al. |
| 4,869,587 A | 9/1989 | Breger |
| 4,874,561 A | 10/1989 | Spector |
| 4,910,277 A | 3/1990 | Bambury et al. |
| 4,921,205 A | 5/1990 | Drew, Jr. et al. |
| 4,952,045 A | 8/1990 | Stoyan |
| 4,954,586 A | 9/1990 | Toyoshima et al. |
| 4,996,275 A | 2/1991 | Ellis et al. |
| 5,002,382 A | 3/1991 | Seidner |
| 5,032,658 A | 7/1991 | Baron et al. |
| 5,034,461 A | 7/1991 | Lai et al. |
| 5,041,511 A | 8/1991 | Yanagawa |
| 5,070,215 A | 12/1991 | Bambury et al. |
| 5,087,392 A | 2/1992 | Burke et al. |
| 5,106,930 A | 4/1992 | Gupta |
| 5,114,628 A | 5/1992 | Hofer et al. |
| 5,170,192 A | 12/1992 | Pettigrew et al. |
| 5,177,168 A | 1/1993 | Baron et al. |
| 5,191,365 A | 3/1993 | Stoyan |
| 5,196,493 A | 3/1993 | Gruber et al. |
| 5,198,867 A | 3/1993 | Campbell |
| 5,200,773 A | 4/1993 | Volk |
| 5,250,583 A | 10/1993 | Kawaguchi et al. |
| 5,260,000 A | 11/1993 | Nandu et al. |
| 5,260,352 A | 11/1993 | Kawakami |
| 5,264,878 A | 11/1993 | Gruber et al. |
| 5,278,243 A | 1/1994 | Soane |
| 5,331,067 A | 7/1994 | Seidner et al. |
| 5,346,946 A | 9/1994 | Yokoyama et al. |
| 5,346,976 A | 9/1994 | Ellis et al. |
| 5,346,978 A | 9/1994 | Baron et al. |
| 5,347,326 A | 9/1994 | Volk |
| 5,362,768 A * | 11/1994 | Askari et al. ................. 523/106 |
| 5,371,147 A | 12/1994 | Spinelli et al. |
| 5,376,693 A | 12/1994 | Viegas et al. |
| 5,401,508 A | 3/1995 | Manesis |
| 5,416,132 A | 5/1995 | Yokoyama et al. |
| 5,416,180 A | 5/1995 | Yokoyama et al. |
| 5,422,687 A | 6/1995 | Tanaka et al. |
| 5,426,133 A | 6/1995 | Hishida et al. |
| 5,433,898 A | 7/1995 | Thakrar et al. |
| 5,448,312 A | 9/1995 | Roffman et al. |
| 5,452,031 A | 9/1995 | Ducharme |
| 5,482,981 A | 1/1996 | Askari et al. |
| 5,498,681 A | 3/1996 | Askari et al. |
| 5,502,086 A | 3/1996 | Hiratani et al. |
| 5,505,884 A | 4/1996 | Burke et al. |
| 5,519,069 A | 5/1996 | Burke et al. |
| 5,519,070 A | 5/1996 | Watanabe et al. |
| 5,543,442 A | 8/1996 | Hiratani et al. |
| 5,556,929 A | 9/1996 | Yokoyama et al. |
| 5,570,142 A | 10/1996 | Lieberman |
| 5,587,445 A | 12/1996 | Mochizuki |
| 5,605,942 A | 2/1997 | Hiratani et al. |
| 5,617,154 A | 4/1997 | Hoffman |
| 5,629,360 A | 5/1997 | Askari et al. |
| 5,629,981 A | 5/1997 | Nerlikar |
| 5,643,249 A | 7/1997 | Amano |
| 5,661,194 A | 8/1997 | Ando et al. |
| 5,662,706 A | 9/1997 | Legerton et al. |
| 5,670,594 A | 9/1997 | Nakada et al. |
| 5,703,143 A | 12/1997 | Hiratani et al. |
| 5,708,050 A | 1/1998 | Nakada et al. |
| 5,712,327 A | 1/1998 | Chang et al. |
| 5,741,030 A | 4/1998 | Moore et al. |
| 5,760,100 A | 6/1998 | Nicolson et al. |
| 5,771,088 A | 6/1998 | Perrott |
| 5,776,999 A | 7/1998 | Nicolson et al. |
| 5,777,032 A | 7/1998 | Yokoyama et al. |
| 5,777,717 A | 7/1998 | Martin et al. |
| 5,777,719 A | 7/1998 | Williams et al. |
| 5,786,434 A | 7/1998 | Ando et al. |
| 5,789,461 A | 8/1998 | Nicolson et al. |
| 5,800,532 A | 9/1998 | Lieberman |
| 5,800,744 A | 9/1998 | Munakata |
| 5,805,264 A | 9/1998 | Janssen et al. |
| 5,807,381 A | 9/1998 | Lieberman |
| 5,811,502 A | 9/1998 | Hiratani |
| 5,812,235 A | 9/1998 | Seidner |
| 5,817,726 A | 10/1998 | Nakada et al. |
| 5,835,192 A | 11/1998 | Roffman et al. |
| 5,846,457 A | 12/1998 | Hoffman |
| 5,849,811 A | 12/1998 | Nicolson et al. |
| 5,869,547 A | 2/1999 | Hiratani |
| 5,872,613 A | 2/1999 | Blum et al. |
| 5,874,127 A | 2/1999 | Winterton et al. |
| 5,880,809 A | 3/1999 | Lieberman et al. |
| 5,910,518 A | 6/1999 | Nakada et al. |
| 5,923,397 A | 7/1999 | Bonafini, Jr. |
| 5,929,969 A | 7/1999 | Roffman |
| 5,949,521 A | 9/1999 | Williams |
| 5,953,098 A | 9/1999 | Lieberman et al. |
| 5,963,297 A | 10/1999 | Reim |
| 5,965,330 A | 10/1999 | Evans et al. |
| 5,965,631 A | 10/1999 | Nicolson et al. |
| 5,973,089 A | 10/1999 | Meijs et al. |
| 5,986,001 A | 11/1999 | Ingenito et al. |
| 5,998,498 A | 12/1999 | Vanderlaan et al. |

| | | | |
|---|---|---|---|
| 6,015,874 A | 1/2000 | Hiratani | |
| 6,020,445 A | 2/2000 | Vanderlaan et al. | |
| 6,039,913 A | 3/2000 | Hirt et al. | |
| 6,043,328 A | 3/2000 | Domschke et al. | |
| 6,050,687 A | 4/2000 | Bille et al. | |
| 6,082,856 A | 7/2000 | Dunn et al. | |
| 6,086,204 A | 7/2000 | Magnante | |
| 6,095,651 A | 8/2000 | Williams et al. | |
| 6,096,799 A | 8/2000 | Benz et al. | |
| 6,116,735 A | 9/2000 | Wada | |
| 6,120,147 A | 9/2000 | Vijfvinkel et al. | |
| 6,135,594 A | 10/2000 | Windey et al. | |
| 6,149,609 A | 11/2000 | Lieberman et al. | |
| 6,169,127 B1 | 1/2001 | Lohmann et al. | |
| 6,199,986 B1 | 3/2001 | Williams et al. | |
| 6,234,631 B1 | 5/2001 | Sarver et al. | |
| 6,241,355 B1 | 6/2001 | Barsky | |
| 6,242,508 B1 | 6/2001 | Benz et al. | |
| 6,245,830 B1 | 6/2001 | Benz et al. | |
| 6,250,757 B1 | 6/2001 | Roffman et al. | |
| 6,255,362 B1 | 7/2001 | Ito | |
| 6,270,221 B1 | 8/2001 | Liang et al. | |
| 6,271,914 B1 | 8/2001 | Frey et al. | |
| 6,271,915 B1 | 8/2001 | Frey et al. | |
| 6,280,435 B1 | 8/2001 | Odrich et al. | |
| 6,305,802 B1 | 10/2001 | Roffman et al. | |
| 6,315,929 B1 | 11/2001 | Ishihara et al. | |
| 6,325,509 B1 | 12/2001 | Hodur et al. | |
| 6,329,445 B1 | 12/2001 | Okumura et al. | |
| 6,338,559 B1 | 1/2002 | Williams et al. | |
| 6,340,229 B1 | 1/2002 | Lieberman et al. | |
| 6,346,594 B1 | 2/2002 | Watanabe et al. | |
| 6,367,929 B1 | 4/2002 | Maiden et al. | |
| 6,379,005 B1 | 4/2002 | Williams et al. | |
| 6,379,008 B1 | 4/2002 | Chateau et al. | |
| 6,412,946 B1 | 7/2002 | Vijfvinkel et al. | |
| 6,416,179 B1 | 7/2002 | Lieberman et al. | |
| 6,520,637 B2 | 2/2003 | Hodur et al. | |
| 6,540,353 B1 | 4/2003 | Dunn | |
| 6,554,424 B1 | 4/2003 | Miller et al. | |
| 6,599,285 B1 | 7/2003 | Lieberman et al. | |
| 6,638,991 B2 | 10/2003 | Baba et al. | |
| 6,727,336 B1 | 4/2004 | Ito et al. | |
| 6,733,124 B2 | 5/2004 | Miyamura et al. | |
| 6,790,873 B2 | 9/2004 | Tomono et al. | |
| 6,849,671 B2 | 2/2005 | Steffen et al. | |
| 6,851,808 B2 | 2/2005 | Heacock | |
| 7,018,039 B2 | 3/2006 | Legerton et al. | |
| 7,097,301 B2 | 8/2006 | Legerton | |
| 7,101,042 B2 | 9/2006 | Pearl et al. | |
| 7,104,648 B2 | 9/2006 | Dahi et al. | |
| 7,163,292 B2 | 1/2007 | Dahi et al. | |
| 7,322,694 B2 | 1/2008 | Dahi et al. | |
| 7,377,637 B2 | 5/2008 | Legerton et al. | |
| 7,380,937 B2 | 6/2008 | Ye et al. | |
| 7,537,339 B2 | 5/2009 | Legerton et al. | |
| 7,543,936 B2 | 6/2009 | Legerton et al. | |
| 7,585,074 B2 | 9/2009 | Dahi et al. | |
| 2001/0033360 A1 | 10/2001 | Koizumi et al. | |
| 2002/0060776 A1 | 5/2002 | Hodur et al. | |
| 2003/0123024 A1 | 7/2003 | Dunn | |
| 2003/0147047 A1 | 8/2003 | Renard | |
| 2005/0018130 A1 | 1/2005 | Dahi et al. | |
| 2006/0238712 A1 | 10/2006 | Dahi et al. | |
| 2006/0256284 A1 | 11/2006 | Dahi et al. | |
| 2007/0013869 A1 | 1/2007 | Dahi et al. | |
| 2007/0273834 A1 | 11/2007 | Legerton et al. | |
| 2008/0074611 A1 | 3/2008 | Meyers et al. | |

FOREIGN PATENT DOCUMENTS

| | | | |
|---|---|---|---|
| GB | 0655901 | | 8/1951 |
| GB | 1417650 | | 12/1975 |
| JP | 04 045420 | | 2/1992 |
| WO | WO 94/06621 | | 3/1994 |
| WO | WO 95/09878 | | 4/1995 |
| WO | WO 01/28410 | A1 | 4/2001 |
| WO | WO 01/89424 | A1 | 11/2001 |
| WO | WO 02/30273 | A1 | 4/2002 |
| WO | WO 04/023374 | | 3/2004 |

OTHER PUBLICATIONS

International Search Report in PCT Application PCT/US2006/039121, mailed Jan. 29, 2007.

International Search Report in related PCT Application No. PCT/US04/36649, mailed Jun. 10, 2005.

International Search Report in related PCT Application No. PCT/US05/04368, mailed Sep. 20, 2005.

Office Action in co-pending U.S. Appl. No. 11/423,112, mailed Jun. 20, 2008.

Office Action in co-pending U.S. Appl. No. 11/423,019, mailed Jun. 23, 2008.

Office Action in co-pending U.S. Appl. No. 11/123,876, mailed Sep. 4, 2007.

Office Action in co-pending U.S. Application No. 11/249,126, mailed Oct. 3, 2007.

Office Action in European Application No. 04810281.8, mailed May 6, 2008.

Search Report in related European Application No. EP 03 79 4619, mailed Oct. 14, 2005.

Supplementary Search Report for related European Application EP 04810281, mailed Nov. 13, 2007.

* cited by examiner

HYBRID CONTACT LENSES PREPARED WITH EXPANSION CONTROLLED POLYMERIC MATERIALS

BACKGROUND OF THE INVENTION

1. Field of the Invention

Embodiments of the present invention relate generally to polymer articles and compositions for medical devices which provide control of dimensional changes in such articles, for example, ophthalmic devices and other suitable medical and non-medical devices.

In certain embodiments, the invention relates to hybrid hard-soft contact lenses possessing improved dimensional stability, oxygen permeability, and machinability.

2. Description of the Related Art

Traditionally, the field of vision correction has involved measuring aberrations in the optics of the eye, by first creating a prescription that corrected for the measured aberrations, and then using the prescription to correct the measured aberration, e.g., by surgery, spectacles or contact lenses. Thus, the ability to correct vision aberrations has been limited by both the degree of accuracy in the measurement of the aberrations and by the ability to correct the measured aberration.

The field of vision correction is currently in the midst of a revolution. New technologies have been developed to measure a variety of aberrations in the optics of the eye to a high degree of accuracy. These new wavefront measurement techniques (such as Shack-Hartmann wavefront sensing or Talbot Interferometry) can precisely measure the eye's aberrations to such a high degree of accuracy that, at least in theory, a customized prescription could be created to correct vision so that it is better than 20/20. Recent advances in laser refractive surgery techniques, such as LASIK and photorefractive keratectomy, as well as improvements in spectacle lens manufacturing, now enable vision to be corrected using eye surgery or spectacles to a degree of accuracy that approaches the accuracy of the new measurement technologies.

However, this is generally not the case with contact lenses, particularly when the correction of higher order aberrations is desired. Popular soft contact lenses cannot currently achieve the same degree of corrective accuracy as spectacles or laser refractive surgery because of dimensional variations in the lenses resulting from conventional soft contact lens fabrication processes. Hard contact lenses, which could theoretically provide a platform to achieve the highly accurate corrections achievable by surgery and spectacles, are not as comfortable as soft contacts and generally lack positional stability on the eye.

Hybrid hard-soft contact lenses, having a relatively hard center portion and a relatively soft outer skirt portion, have been developed which could theoretically provide both a platform for a more accurate corrective prescription and also provide the comfort of soft contact lenses. In the typical process for manufacturing hybrid lenses of the rigid center/soft skirt (RC/SK) type, the rigid center polymer is pre-fabricated by polymerizing monomer to form a rigid polymer, followed by polymerization of the soft skirt components in direct contact with the preformed rigid polymer, and then hydration with water. In addition to simplifying the manufacturing process, this method of manufacture avoids the deleterious effects which the presence of the soft components may have on the properties of the rigid portion, arising from interaction of the monomers which form the hard and soft portions. Such effects may include loss of modulus, low strength, refractive index changes, and/or loss of oxygen transport properties.

A consequence of pre-fabricating the rigid portion of the lens, however, is that the rigid portion has fixed dimensions and does not easily accommodate dimensional changes that might later take place in the surrounding skirt material. For example, upon hydration of the lens, the hard and soft portions absorb water, with the soft portion swelling significantly more than the hard portion. The differential expansion between the soft portion and the hard portion results in stresses about the region of the junction between the two portions. These stresses may manifest themselves as physical distortions of the lens geometry and/or weakening of the bond between the hard and soft portions, degrading the performance of the hybrid lens.

Similarly, in other medical devices, such as cardiovascular equipment and other body implants where a hydrophilic surface is adhered to the device, stresses from hydration have been found to result in spalling of the coating and other types of failures due to unequal swelling or other distortions induced by water absorption.

The constraint arising from pre-fabrication of the rigid portion of the medical device or lens can be mitigated if the soft portion of the medical device or lens is fabricated and bonded to the rigid portion while in its fully expanded state. Such pre-expansion has been attempted using the addition of water to the skirt monomers at the time of polymerization. Unfortunately, water is not compatible with the monomers preferable in many soft lens material compositions and may cause the components or intermediates to phase separate prior to, or during, the polymerization process. Further, fully hydrated polymers are generally too soft to machine into final shape after polymerization and thus are constrained for use in fully molded products.

The incompatibility of water with the components and intermediates of the skirt portion can be avoided by replacement of water by other expansion control agents. These agents serve as temporary stand-ins for the water prior to and during polymerization and are intended to be extracted after polymerization and processing and replaced by water.

For example, U.S. Pat. No. 5,260,000 to Nandu, et al., discloses expansion control agents comprising low polarity saturated hydrocarbons and diluents of intermediate polarity. Examples of such species include alcohols, esters, ethers or acids. Low to moderate polarity agents, however, are found to result in skirts possessing poor mechanical properties when utilized in quantities high enough to allow their subsequent displacement by water. Thus, machining the skirts while the low to moderate polarity expansion control agents remain in the skirt polymer is difficult because the polymers are too soft. Furthermore, organic agents are problematic as their toxicity requires removal of leachable toxic residues from the lens, adding significant time and cost to the lens manufacturing process.

Alternative expansion control agents to simple hydrocarbons include low molecular weight, water soluble polymers. For example, U.S. Pat. No. 4,121,885 to Erickson, et al., discloses low molecular weight, water soluble oligomers such as polyoxyethylene, polyethylene glycol, polyvinyl alcohol, dextran, and polyvinylpyrrolidinone. While these oligomers reduce the toxicity issues discussed above and have lesser impact on pre-hydration mechanical properties, they suffer from low solubility in skirt monomer compositions, restricting their use to low water skirt products. Furthermore, these oligomers are difficult to extract from fabricated skirt polymers, due to their high molecular size relative to the pore size found in the skirt polymers. Additionally, the low propensity of the oligomers to crystallize leads to instability in the buttons produced with them when these fillers bloom to the surface, altering the expansion properties of the skirts so produced.

Another difficulty encountered with hybrid lenses of the prior art is the low oxygen permeability of the materials used in such lenses. Since the cornea receives its oxygen supply exclusively from contact with the atmosphere, good oxygen permeability is an important characteristic for any contact lens material. In particular, the oxygen permeability of the skirt material of prior art lenses was dependent solely on the water content of the traditional hydrogels used in these lenses. It was found that the higher the water content within the skirt material of prior art hybrid lenses, the greater was the oxygen permeability through the skirt to the cornea.

However, high water containing hydrogels have exhibited undesirable mechanical properties. These properties include poor tensile strength, which may result in tearing or other breakage, as well as an increase in the distortions about the region of the junction discussed above. The greater the water content, the greater the expansion factor to be countered by any control agent.

In order to improve and balance the oxygen permeability of the skirt in hybrid lenses with other desired properties, such as hardness/machinability, wettability and other mechanical properties, polymer compositions containing hydrophobic silicone groups and hydrophilic groups were developed, the so-called silicone hydrogels. A variety of silicone hydrogel polymers have been disclosed as having high oxygen permeability, on-eye movement and tear exchange. For example, see U.S. Pat. No. 4,711,943 to Harvey and U.S. Pat. No. 5,260,000 to Nandu, et al.

While silicone hydrogels provide a better balance of the properties relevant to corneal health, their xerogel state before hydration suffers, in general, from poor machinability due to a low hardness. As a result, the preferred manufacturing mode primarily is using molding processes. Further, in the absence of suitable expansion control agents, silicone hydrogels suffer from the same mechanical shortcomings as traditional hydrogels when used in hybrid lenses. Furthermore, the expansion control agents used to control the expansion upon hydration in traditional hydrogels cannot be used in silicone hydrogels due to their substantial incompatibility to homogenously mix with the latter.

Thus, while many solutions have been explored to solve the problem of hybrid lens manufacture, none to date has proven satisfactory. Accordingly, there is a need for improved methods of manufacture which provide hybrid contact lenses that are easily machined and possess substantially little distortion when hydrated, while concurrently providing the mechanical and optical properties requisite for the function the hybrid lenses.

SUMMARY OF THE INVENTION

In accordance with one embodiment, a hybrid contact lens blank is provided, comprising a rigid center portion, a skirt portion disposed about the center portion, and a diluent dispersed within the skirt portion, wherein the diluent comprises at least one selected from polylactic acid, polyglycolic acid, lactide, glycolide, a polyacetal, a cyclic acetal, a polyketal, a cyclic ketal, a polyorthoester, a cyclic orthoester, di-t-butyl-dicarbonate, tris(trimethylsilyl)amine, and 2,2,2-trifluoroacetamide.

In accordance with another embodiment, a xerogel polymer composition is provided, comprising a vinyl amide recurring unit, a polysiloxanylalkyl acrylate or methacrylate recurring unit, a fluorine containing recurring unit, a styrene containing recurring unit, a crosslinking unit, and a diluent comprising at least one selected from polylactic acid, polyglycolic acid, lactide, glycolide, a polyacetal, a cyclic acetal, a polyketal, a cyclic ketal, a polyorthoester, a cyclic orthoester, di-t-butyl-dicarbonate, tris(trimethylsilyl)amine, and 2,2,2-trifluoroacetamide.

In accordance with yet another embodiment, a xerogel polymer composition is provided, comprising a polymer, and a diluent dispersed within the polymer, wherein the diluent comprises at least one selected from polylactic acid, polyglycolic acid, lactide, glycolide, a polyacetal, a cyclic acetal, a polyketal, a cyclic ketal, a polyorthoester, a cyclic orthoester, di-t-butyl-dicarbonate, tris(trimethylsilyl)amine, and 2,2,2-trifluoroacetamide, wherein the amount of diluent is selected so that upon substantially full hydration, the xerogel composition undergoes a linear expansion of less than approximately 8%.

In accordance with still another embodiment, a hybrid contact lens is provided. The hybrid contact lens comprises a rigid center portion, comprising an acrylate recurring unit, a styrene containing recurring unit, a silicon containing recurring unit, a fluorine containing recurring unit, and a cross-linking unit. The hybrid contact lens also comprises an annular skirt portion coupled to the center portion at a junction between an outer peripheral edge of the center portion and an inner edge of the annular skirt portion, wherein the skirt portion comprises a vinyl amide recurring unit, a polysiloxanylalkyl acrylate or methacrylate recurring unit, a fluorine containing recurring unit, a styrene containing recurring unit, a cross-linking unit, and a diluent dispersed within the skirt portion, wherein the diluent comprises at least one selected from polylactic acid, polyglycolic acid, lactide, glycolide, a polyacetal, a cyclic acetal, a polyketal, a cyclic ketal, a polyorthoester, a cyclic orthoester, di-t-butyl-dicarbonate, tris(trimethylsilyl)amine, and 2,2,2-trifluoroacetamide.

In accordance with yet another embodiment, a method for preparing a hybrid contact lens is provided. The method comprises providing a substantially rigid center portion, forming a peripheral skirt portion in the presence of the center portion, the skirt portion comprising a xerogel polymer and a diluent dispersed within the skirt portion, wherein the diluent comprises at least one selected from polylactic acid, polyglycolic acid, lactide, glycolide, a polyacetal, a cyclic acetal, a polyketal, a cyclic ketal, a polyorthoester, a cyclic orthoester, di-t-butyl-dicarbonate, tris(trimethylsilyl)amine, and 2,2,2-trifluoroacetamide, and machining at least the skirt portion to a selected shape while the diluent is present in the skirt portion.

DETAILED DESCRIPTION OF THE PREFERRED EMBODIMENT

Embodiments of the present disclosure provide xerogel polymer compositions comprising novel diluents which facilitate the manufacture of substantially non-expanding hydrogel polymers for use in applications such as medical devices. These diluents are formulated so as to function as a "stand-in" for water in the xerogel polymer, allowing the xerogel to form and bond to other surfaces in its fully expanded state such that, upon hydration of the xerogel to form a hydrogel, substantially little dimensional change, and thus substantially little distortion in the hydrogel, is achieved. The novel diluents of the present disclosure further preserve the mechanical integrity of the xerogel, allowing the xerogel to be machined to final shape, improving the dimensional tolerances which can be achieved in the hydrogel.

In the discussion below, the novel diluents are discussed in the context of hybrid contact lenses. It may be understood, however, that hybrid lenses represent only one possible example of the use of xerogel polymer compositions comprising the novel diluents and should not be construed to limit the applicability of the embodiments of the disclosure.

Beneficially, embodiments of the novel diluents may exhibit one or more of the following performance criteria which facilitate the manufacture and function of hybrid lenses formed using the diluents.

In some embodiments, the novel diluents may possess chemical compatibility with monomers and polymerization intermediates existing in the monomer formulation or formed during processing of a polymeric hydrogel skirt material. This compatibility prevents deleterious chemical reactions, or phase separation, which may result in poor optical and/or mechanical properties in the xerogel and hydrogel.

In other embodiments, the novel diluents may possess sufficient solubility in the xerogel monomer formulation so as to stand-in for the volume of water to be ultimately imbibed by the hydrogel. This solubility allows the diluents to occupy approximately the same volume of water imbibed upon hydration of the xerogel, thus providing a skirt portion which undergoes substantially little dimensional change when the diluents are displaced by water during hydration. Advantageously, as the rigid center portion also undergoes substantially little dimensional change upon hydration, the diluents inhibit the formation of significant stresses and the attendant physical distortions in the lens which can arise due to differential expansion of the center and skirt portions.

In certain embodiments, the novel diluents may also possess low volatility. This low volatility inhibits evaporative loss of the diluents from the xerogel during processing. This characteristic allows the volume of the diluents to remain substantially constant during the synthesis of the skirt portion, further facilitating the diluent's role as a stand-in for water, allowing the diluent to occupy approximately the same volume of water imbibed upon hydration of the xerogel. Absent this characteristic, the volume of the diluents may significantly change during synthesis, leading to substantial dimensional changes in the skirt portion during manufacture, with the attendant problems discussed above.

In additional embodiments, the novel diluents may cause substantially no degradation of the mechanical, optical, and oxygen transport properties of the rigid center portion or the skirt portion. Selected values of these properties are assumed during the design of the hybrid lens. If these values are not maintained, the resulting hybrid lens will fail to provide the appropriate vision correction for the patient. Thus, by having no significant impact on the mechanical, optical, and oxygen transport properties of the rigid center and skirt portions, the novel diluents allow the rigid center and skirt portions to maintain acceptable properties for proper function of the fabricated hybrid contact lens.

In further embodiments, the novel diluents may possess low molecular size and high solubility in water. Generally, the smaller a solute molecule, the more soluble the substance will be. Thus, the low molecular size of the novel diluents facilitates their solubility within skirt polymer formulations, as well as water. This solubility allows formation of the skirt in its substantially fully expanded state as well as easily promoting easy extraction of the diluent during hydration.

In other embodiments, the novel diluents and their residues may possess substantial biocompatibility, non-toxicity, non-carcinogenicity. Preferably, diluent residues arising from synthesis and/or hydration of the diluent comprise species which exist in normal tear fluid. Because of the long exposure time of the hybrid lenses to the mucous membranes of the eye and underlying cornea, these portions of the eye are subject to deleterious effects from even low residual amounts of leachable species. Thus, the novel diluents and their residues are substantially safe and non-irritating for use in the hybrid lenses.

In additional embodiments, the novel diluents may maintain stable dispersions in xerogel polymer formulations having a propensity to crystallize. This property allows the diluents to remain substantially evenly distributed within the xerogel during and after synthesis so as to avoid differential swelling of the skirt portion upon hydration.

In certain embodiments, discussed in greater detail below, the novel diluents comprise at least one selected from polylactic acid, polyglycolic acid, lactide, glycolide, a polyacetal, a cyclic acetal, a polyketal, a cyclic ketal, a polyorthoester, a cyclic orthoester, di-t-butyl-dicarbonate, tris(trimethylsilyl) amine, and 2,2,2-trifluoroacetamide. In some embodiments described in greater detail below, the diluents are added to monomer mixtures for skirt polymers in quantities sufficient to manufacture polymers that, upon water penetration during hydration, hydrolyze to yield highly polar and water soluble lactic or glycolic acid as byproducts. These hydrolysis products then diffuse from the xerogel polymer and are replaced by water molecules. Advantageously, as lactic and glycolic acids are naturally found in the tear fluid, they are non-toxic in small quantities. Thus, extraction of the lactic and/or glycolic acid is only required to the degree that provides geometric stability to the hybrid lens and is below toxic concentrations sufficient to alter tear pH or tonicity. Specific polymer formulations, methods of manufacture, and properties of xerogel polymers, hybrid contact lenses, and intermediates employing these novel diluents are discussed in greater detail below.

The term "hybrid contact lens" as used herein has its ordinary meaning as known to those skilled in the art and thus includes a variety of contact lenses adapted for positioning on the surface of the eye. The hybrid contact lenses comprise a substantially rigid center portion and a substantially flexible skirt portion disposed about the periphery of the center portion. In some embodiments, the skirt portion comprises a substantially flexible annular portion coupled to the substantially rigid center portion at a junction defined at least in part by an outer edge of the substantially rigid center portion.

The term "xerogel polymer", as used herein, has its ordinary meaning as known to those of skill in the art, see IUPAC Compendium of Chemical Terminology, $2^{nd}$ edition, 1997. In the context of the hybrid contact lenses described herein, xerogel polymers will be understood as reference to dry macromolecular compositions which have passed a gel stage during preparation in the absence of added water.

The term "hydrogel polymer", as used herein, has its ordinary meaning as known to those of skill in the art. In the context of the hybrid contact lenses, described herein, hydrogel polymers will be understood as reference to hydrated, cross-linked polymeric systems that contain water in an equilibrium state. Typically, water incorporation is effected by soaking a given polymer composition in a water solution for a sufficient period of time so as to incorporate from about 10 to about 85 weight percent water, and preferably from about 10 to about 50 weight percent water, into the polymer composition based on the total weight of the polymer composition.

The term "Dk", as used herein, has its ordinary meaning as known to those skilled in the art and thus will be understood as a reference to the oxygen permeability of a contact lens, i.e., the amount of oxygen passing through the contact lens material over a given set of time and pressure difference conditions, expressed in units of $10^{-11}$ ($cm^2$/sec) (mL $O_2$)/(mL mm Hg), a unit that is known as a barrer. Those skilled in the art will appreciate that oxygen transmissibility can be expressed as Dk/t, where t is the thickness of the lens, and thus Dk/t represents the amount of oxygen passing through a contact lens of a specified thickness over a given set of time and pressure difference conditions, expressed in units of barrers/cm or $10^{-11}$ (cm/sec) (mL $O_2$)/(mL mm Hg). See ISO International Standard 9913-1, "Determination of Oxygen Permeability and Transmissibility by the Fatt Method)" Geneva, Switzerland: International Organization for Standardization, 1996 and ISO International Standard 9913-1, "Optics and optical instruments—Contact lenses," Geneva, Switzerland: International Organization for Standardization, 1996.

Those skilled in the art will further understand that references herein to particular monomeric materials to be references to such monomers as well as to both crosslinked and uncrosslinked versions of polymers (including copolymers) synthesized by polymerizing or copolymerizing the recited monomers, unless clearly stated otherwise.

Figure 1:
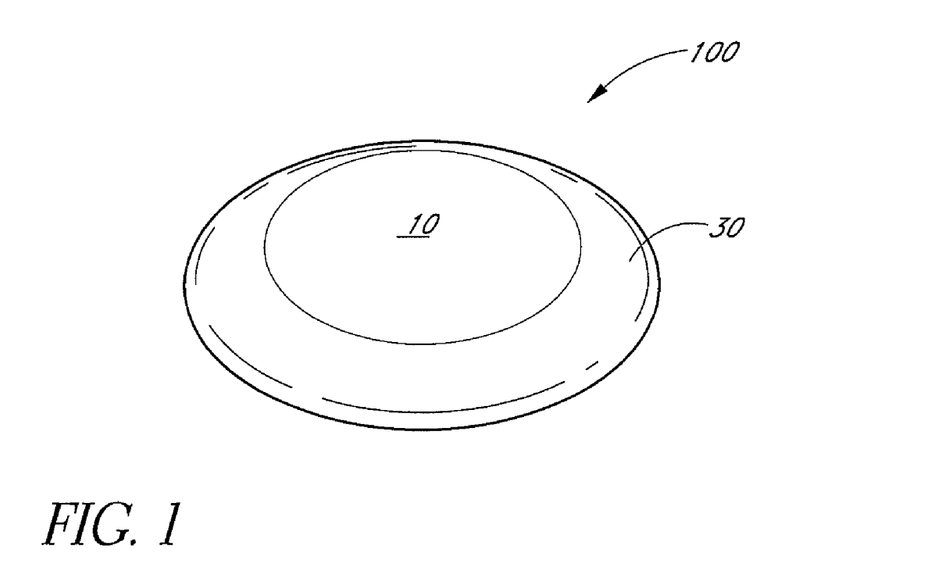
FIG. 1 is a perspective schematic view of an embodiment of a hybrid contact lens described herein.
Figure 2:
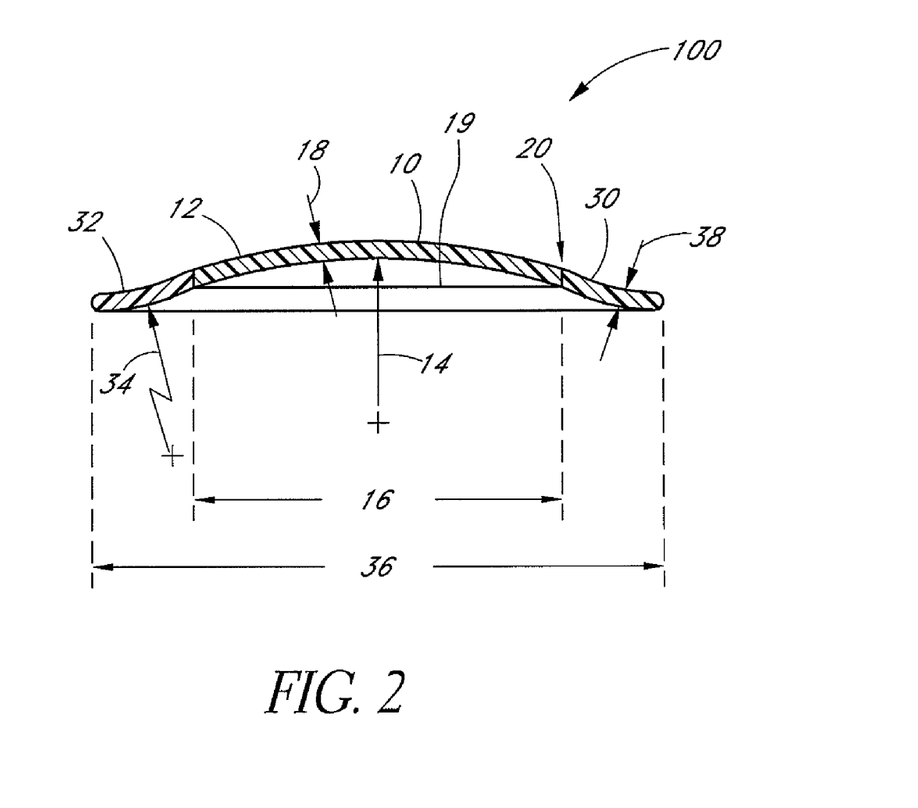
FIG. 2 is a schematic cross-sectional side view of an embodiment of a hybrid contact lens described herein.

FIGS. 1 and 2 illustrate an embodiment of a hybrid contact lens 100 which exhibits substantially reduced stresses and physical distortion. The hybrid contact lens 100 has a substantially rigid center portion 10 and a substantially flexible, skirt portion 30 disposed about the center portion 10. In the illustrated embodiment, the skirt portion is an annular skirt portion 30 coupled to the substantially rigid center portion 10 at a junction 20. In the illustrated embodiment, the substantially rigid portion 10 is the central portion (rigid center) of the hybrid contact lens 100. In certain embodiments, the substantially rigid portion 10 is gas permeable and has a first curvature 12 or base curve having a contour defined by a radius 14. In some embodiments, the radius 14 has a length in the range of about 5.0 mm to about 10.5 mm, for example about 7.70 mm. However, other suitable values for the radius 14 can be used.

The hybrid contact lens 100 also defines a diameter 16 of the substantially rigid center portion 10, as shown in FIG. 2. This diameter 16 may be, in general, approximately greater than, less than or equal to the chord 19 defined by the intersection points of radius 14 of the base curve 12 with the surface of the lens 100. In an embodiment, the substantially rigid center portion 10 has a diameter 16 in the range of about 4.0 mm to about 12.0 mm, for example about 8.5 mm. However, the diameter 16 can have other suitable values.

In the illustrated embodiment, the substantially rigid center portion 10 further has a thickness 18 that is generally uniform along the base curve 12. In an embodiment, the thickness 18 is in the range of about 0.06 mm and about 0.40 mm, for example about 0.20 mm. However, other suitable values for the thickness 18 can be used. In other embodiments, the thickness 18 can taper from the apex to the circumferential edge of the substantially rigid portion 10. Reference to the center thickness of the substantially rigid center portion 10 will be understood as a reference to the axial or radial thickness of the center portion 10 along the lens axis at approximately the geometrical center. Reference to the edge thickness of the substantially rigid center portion 10 will be understood as a reference to the peripheral portion of the center portion 10 having a surface continuous with the front and back surfaces of the center portion 10. Those of ordinary skill in the art will recognize that the thickness 18 can have a variety of suitable configurations.

In certain embodiments, the circumferential edge of the substantially rigid center portion 10 is coupled at the junction 20 to the substantially flexible skirt portion 30 of the hybrid contact lens 100, as shown in FIG. 2. In some embodiments, the substantially flexible skirt portion 30 is a substantially flexible annular portion that is coupled to the substantially rigid center portion 10 at the junction 20 defined, at least in part, by an outer edge of the substantially rigid center portion 10. It will be understood that the junction 20 may define the edge of a transition region (not shown in FIG. 2) in which the materials and properties of the center portion 10 gradually taper, or merge, into the materials and properties of the skirt portion 30, or in which the skirt portion itself comprises or consists essentially of such a tapered structure. In such cases, it will be understood that the junction 20 defines the edge of such a transition region, which in turn is used to determine the diameter 16 of the substantially rigid center portion 10.

The substantially flexible skirt portion 30 is, in some embodiments, defined by a second curvature or curved surface 32. In an embodiment, the second curvature 32 is defined by a skirt radius 34 having a length in the range of about 7.0 mm to about 11.0 mm, for example about 9.0 mm. However, the skirt radius 34 can have other suitable values. In the illustrated embodiment, the skirt radius 34 is longer than the center portion radius 14. However, in other embodiments, the skirt radius 34 is about equal to the center portion radius 14. In still another embodiment, the skirt radius 34 is shorter than the center portion radius 14.

The substantially flexible skirt portion 30 has a skirt thickness 38. In a certain embodiments, the skirt thickness 38 is generally uniform throughout the substantially flexible skirt portion 30. In an embodiment, the thickness 38 is in the range of about 0.04 mm to about 0.28 mm, for example about 0.12 mm. However, in other embodiments, the skirt thickness 38 can have other suitable values and/or vary along the soft skirt 30. In an embodiment, the skirt thickness 38 tapers from the junction 20 to an overall lens diameter 36. In another embodiment, the thickness 38 is sculpted, as discussed in U.S. application Ser. No. 11/123,876, filed May 6, 2005, which is hereby incorporated by reference in its entirety and particularly for the purpose of describing such hybrid lenses and methods of making them.

In an embodiment, the overall lens diameter 36 is in the range of about 10.0 mm to about 20.0 mm, for example about 14.5 mm. However, other suitable values for the overall lens diameter 36 can be used. Those skilled in the art will understand that, in the illustrated embodiment, the value of the overall lens diameter 36 is the same as that of the outer diameter of the skirt portion 30.

The substantially rigid center portion, in some embodiments, has a relatively high modulus, e.g., an elastic modulus in the range of about 8,500 to 22,000 $kgf/cm^2$. The substantially rigid center portion 10 comprises a polymeric material suitable for inclusion in a contact lens. In some embodiments, the polymeric material is crosslinked to a degree that provides the desired modulus, in a manner known to those skilled in the art. The monomers, diluents, and cross-linking units described below are generally known and may be commercially purchased or synthesized by generally understood methods.

In one embodiment, the rigid center portion 10 may be synthesized from a monomer formulation comprising one or more recurring units selected from the group consisting of an acrylate recurring unit, a styrene containing recurring unit, a silicon containing recurring unit, a fluorine containing recurring unit, and a crosslinking unit. The crosslinking unit may, in one embodiment, be selected from at least one of divinyl benzene, ethyleneglycol dimethacrylate, and vinyl methacrylate.

In another embodiment, the substantially rigid center portion may comprise, for example, one or more polymeric materials comprising recurring units selected from (meth)acrylic monomers (including linear alkyl (meth)acrylates, branched alkyl (meth)acrylates, and cyclic alkyl (meth)acrylates), silicone-containing (meth)acrylates, fluorine-containing (meth)acrylates, hydroxyl group containing (meth)acrylates, (meth)acrylic acid, N-(meth)acryloylpyrrolidone, (meth)acrylamides, aminoalkyl (meth)acrylates, alkoxy group-containing (meth)acrylates, aromatic group containing (meth)acrylates, silicone-containing styrene derivatives, fluorine-containing styrene derivatives, styrene derivatives, and vinyl monomers.

In a certain embodiments, one or more of the following recurring units may be copolymerized to form the rigid center portion:

from about 1 to about 10 mol % methacrylic acid recurring units, from about 2 to about 11 mol % 2,6-dichlorostyrene recurring units, from about 10 to about 55 mol % styrylethyl-tris(trimethylsiloxy)silane recurring units, from about 1 to about 10 mol % [1,1,3,3-tetrakis[(trimethylsilyl)oxy]-1,3-disiloxanediyl]di-3,1-propanediyl dimethacrylate recurring units, from about 1 to about 8 mol % of at least one of divinyl benzene, ethyleneglycol dimethacrylate, and vinyl methacrylaterecurring units, from about 1 to about 8 mol % 1,1,1,3,3,3-hexafluoroisopropyl methacrylate recurring units, and from about 5 to about 35 mol % 3-[3,3,3-trimethyl-1,1-bis[(trimethylsilyl)oxy]disiloxanyl]propyl methacrylaterecurring units where the amounts of each of the recurring units are with respect to the total number of mols of recurring units of the rigid portion.

In one embodiment, the skirt portion 30 comprises an annular skirt that extends from the junction 20 at the circumferential edge of the rigid portion 10 to an outer diameter or overall lens diameter 36 of the contact lens 100. The substantially flexible skirt portion 30 has a relatively low modulus, for example, a modulus that is lower than the modulus of the substantially rigid center portion 10. In some embodiments, the elastic modulus of the skirt portion lies within the range of about 1.5 to 30 kgf/cm$^2$.

The skirt portion 30 can comprise a polymeric material that comprises recurring units. In one embodiment, the skirt portion comprises a xerogel polymer. The xerogel polymer formulation can include a vinyl amide recurring unit, a polysiloxanylalkyl acrylate or methacrylate recurring unit, a fluorine containing recurring unit, a styrene containing recurring unit, a cross-linking unit, and a diluent.

In certain embodiments, the diluent comprises at least one selected from polylactic acid, polyglycolic acid, lactide, glycolide, a polyacetal, a cyclic acetal, a polyketal, a cyclic ketal, a polyorthoester, a cyclic orthoester, di-t-butyl-dicarbonate, tris(trimethylsilyl)amine, and 2,2,2-trifluoroacetamide.

In further embodiments, the polyorthoester comprises at least one selected from a methoxymethylene, an ethoxymethylene, a 1-(N,N-dimethylamino)ethylidene, a methanesulfonate and a toluenesulfonate.

In additional embodiments, the cyclic orthoester comprises at least one selected from a methoxymethylene, an ethoxymethylene, a 1-(N,N-dimethylamino)ethylidene, a methanesulfonate and a toluenesulfonate.

In other embodiments, the polyketal comprises at least one selected from a methylene, a ethylidene and a 2,2,2-trichloroethylidene.

In further embodiments, the cyclic ketal comprises at least one selected from a methylene, a ethylidene and a 2,2,2-trichloroethylidene.

In certain embodiments, the diluents are selected from the group consisting of L-lactide, Di-t-butyl-dicarbonate, Tris (trimethylsilyl)amine, and 2,2,2-Trifluoroacetamide. In some embodiments, the amount of diluent is selected such that, upon hydration, the xerogel composition undergoes a linear expansion of between approximately 0 to 8%. In alternative embodiments, the diluent is present in an amount sufficient to provide the skirt portion with an elastic modulus of at least about 3-14 kgf/cm$^2$ after substantially full hydration. In certain embodiments, the diluent is present within the range of approximately 5 to 35 wt % based upon the total weight of the skirt portion 30.

The cross-linking units may comprise one or more cross-linking units known in the art. In certain embodiments, the cross-linking unit possesses at least 2 vinyl functionalities. In alternative embodiments, the cross-linking unit possesses from about 2 to 6 vinyl functionalities and has a number average molecular weight of from about 100 to about 2,500. In further embodiments, the vinyl functionalities comprise acrylate or methacrylate groups attached to a backbone comprising at least one of a polyoxyalkylene backbone (including, but not limited to, halogenated derivatives thereof), a polyalkylene backbone, a glycol backbone, a glycerol backbone, a polyester backbone, and a polycarbonate backbone.

In certain embodiments, the reactive vinyl group is attached to the backbone of the cross-linking unit via an ester bond such as that found in acrylate and methacrylate derivatives. Examples of these derivatives include, but are not limited to, urethane diacrylate, urethane dimethacrylate, ethylene glycol diacrylate, ethylene glycol dimethacrylate, polyoxyethylene diacrylate, and polyoxyethylene dimethacrylate. Further non-limiting examples of other suitable vinyl compounds comprise di- and higher-vinyl carbonates, di- and higher-vinyl amides (e.g., $CH_2=CH-CO)NHCH_2CH_2NH-CO)CH=CH_2$).

Embodiments of cross-linking units include, but are not limited to, ethylene glycol dimethacrylate, ethylene glycoldiacrylate, diethylene glycol dimethacrylate, diethylene glycol diacrylate, triethylene glycol dimethacrylate, triethylene glycol diacrylate, tetradecaethylene glycol dimethacrylate, tetradecaethylene glycol diacrylate, allyl methacrylate, allyl acrylate, trimethylol-propane trimethacrylate, trimethylol-propane triacrylate, 1,3-butanediol dimethacrylate, 1,3-butanediol diacrylate, 1,4-butanediol dimethacrylate, 1,4-butanediol diacrylate, 1,6-hexanediol dimethacrylate, 1,6-hexanediol diacrylate, 1,9-nonanediol dimethacrylate, 1,9-nonanediol diacrylate, 1,1O-decanediol dimethacrylate, 1,1Odecanediol diacrylate, neopentyl glycol dimethacrylate, neopentyl glycol diacrylate, 2,2'bis[p-(y-methacryloxy-βhydroxypropoxy)phenyl]propane, pentaerythritol triacrylate, pentaerythritol trimethacrylate, pentaerythritol tetraacrylate, pentaerythritol tetramethacrylate, 1,4-cyclohexanediol diacrylate, 1,4-cyclohexanediol dimethacrylate, ethoxylated bis-phenol-A-diacrylate, ethoxylated bis-phenol-A-dimethacrylate, bis-phenol-A-dimethacrylate, bis-phenol-A-diacrylate, N,N'-methylenebisacryl-amide, and the like.

In another embodiment, the skirt portion 30 can include a polymeric material that comprises recurring units selected from (meth)acrylic monomers including linear (siloxanyl) alkyl (meth)acrylates, branched (siloxanyl)alkyl (meth)acrylates, and cyclic (siloxanyl)alkyl (meth)acrylates, silicone-containing (meth)acrylates, fluorine-containing (meth) acrylates, hydroxyl group containing (meth)acrylates, (meth) acrylic acid, N-(meth)acryloylpyrrolidone, (meth) acrylamides, aminoalkyl (meth)acrylates, alkoxy group-containing (meth)acrylates, aromatic group containing (meth)acrylates, glycidyl (meth)acrylate, tetrahydrofurfuryl (meth)acrylate, silicone-containing styrene derivatives, fluorine-containing styrene derivatives, styrene derivatives, and vinyl monomers.

In some embodiments, one or more of the following recurring units may be copolymerized to form the xerogel polymer, the amounts of each on the basis of the total number of mols of the skirt polymer:

about 65 to about 75 mol % dimethylacrylamide recurring units, about 1 to about 2 mol % ethyleneglycol dimethacrylate recurring units, about 0.2 to about 0.6 mol % 1,1,1,3,3,3-Hexafluoroisopropyl methacrylate recurring units, about 1.5 to about 2 mol % styrene recurring units, and about 25 to about 30 mol % tris(trimethylsiloxy)silylpropyl methacrylate recurring units, where the amount of each of the foregoing recurring units is on the basis of the total number of mols in the xerogel. It may be understood that the corresponding hydrogel is provided by substantially displacing the diluent with water.

The skirt portion 30 can be fabricated in various ways, as understood in the art. The substantially rigid center portion 10 and substantially flexible skirt portion 30 may be fabricated in an integral manner or may be joined or coupled by a bonding material or resin.

In some embodiments, the flexible skirt portion 30 is synthesized by polymerizing the requisite monomers in the presence of the rigid portion 10 and the diluent. For example, in one embodiment, a mixture of the skirt portion monomers and the diluent are cast in assembled cups containing junction trimmed buttons of the rigid portion 10. The rigid portion 10, in certain embodiments, is surface treated with mixture of an adhesion promoter and methacrylate formulations to enhance the bonding between the hard and soft segments.

In other embodiments, the bonding material or resin may include, but is not limited to, any of the following materials, including combinations and derivatives thereof: vinyl acetate; 2-hydroxylethylmethacylate (HEMA), methyl methacrylate, ethyl methacrylate, ethylacrylate, methyl acrylate, acrylate and methacrylate oligomers, acidic acrylate and methacrylate oligomers, polyester acrylate, polyester, acrylate phosphate ester, aliphatic urethane acrylate, and epoxy terminated acrylate oligomers containing heat or UV initiators. The junction can also be modified by oxygen or ammonia plasma and corona treatment prior to casting the soft material around the hard center.

The hybrid lens, after being formed into rough shape, is subjected to one or more machining operations in order to provide a lens having a selected geometry. Advantageously, the presence of the diluent within the soft portion of the hybrid lens provides mechanical properties sufficient to machine the lens to desired geometrical tolerances. In one embodiment, such machining operations may include, but are not limited to, base curve and front surface lathing, Following machining, the diluent is removed from the hybrid lens, replaced by water. In certain embodiments, the hybrid lens is placed in water at about 45° C. for up to about 24 hrs to remove the diluent. In alternative embodiments, the hybrid lens is placed in buffered water at about pH 2-12, for up to about 24 hours to remove the diluent. In the case where buffered water is utilized, the lens is subsequently soaked in water at about 45° C. for at least about 6 hrs to remove the buffered solution. The hydrated lens may further be soaked in saline solution.

The skirt portion 30 fabricated according to embodiments of the present disclosure, discussed herein, possess optical properties which are suitable for use in a contact lens. In one aspect, the skirt portion 30 is substantially optically clear. In another aspect, the skirt 30 possesses a Dk of at least approximately 30 barrers.

Further discussion of materials and methods of manufacture of hybrid contact lenses are provided in U.S. Pat. No. 7,104,648, which is hereby incorporated by reference in its entirety and particularly for the purpose of describing such materials and methods.

Although these inventions have been disclosed in the context of a certain preferred embodiments and examples, it will be understood by those skilled in the art that the present inventions extend beyond the specifically disclosed embodiments to other alternative embodiments and/or uses of the inventions and obvious modifications and equivalents thereof. In addition, while a number of variations of the inventions have been shown and described in detail, other modifications, which are within the scope of the inventions, will be readily apparent to those of skill in the art based upon this disclosure. It is also contemplated that various combinations or subcombinations of the specific features and aspects of the embodiments may be made and still fall within one or more of the inventions. Accordingly, it should be understood that various features and aspects of the disclosed embodiments can be combine with or substituted for one another in order to form varying modes of the disclosed inventions. Thus, it is intended that the scope of the present inventions herein disclosed should not be limited by the particular disclosed embodiments described above.

What is claimed is:

1. A hybrid contact lens blank, comprising:
   a rigid center portion;
   a skirt portion disposed about the center portion; and
   a diluent dispersed within the skirt portion, wherein the diluent comprises at least one selected from polylactic acid, polyglycolic acid, lactide, glycolide, a polyacetal, a cyclic acetal, a polyketal, a cyclic ketal, a polyorthoester, a cyclic orthoester, di-t-butyl-dicarbonate, tris(trimethylsilyl)amine, and 2,2,2-trifluoroacetamide.

2. The hybrid lens blank of claim 1, wherein the polyorthoester comprises at least one selected from a methoxymethylene, an ethoxymethylene, a 1-(N,N-dimethylamino)ethylidene, a methanesulfonate and a toluenesulfonate.

3. The hybrid lens blank of claim 1, wherein the cyclic orthoester comprises at least one selected from a methoxymethylene, an ethoxymethylene, a 1-(N,N-dimethylamino)ethylidene, a methanesulfonate and a toluenesulfonate.

4. The hybrid lens blank of claim 1, wherein the polyketal comprises at least one selected from a methylene, a ethylidene and a 2,2,2-trichloroethylidene.

5. The hybrid lens blank of claim 1, wherein the cyclic ketal comprises at least one selected from a methylene, a ethylidene and a 2,2,2-trichloroethylidene.

6. The hybrid lens blank of claim 1, wherein the diluent is configured to be readily removable by water during hydration of the lens blank.

7. The hybrid lens blank of claim 1, wherein the rigid center portion comprises a gas permeable material.

8. The hybrid lens blank of claim 1, wherein the skirt portion comprises a hydrogel polymer having a Dk greater than about 30 barrers.

9. The hybrid lens blank of claim 8, wherein the hydrogel comprises:
a vinyl amide recurring unit;
a polysiloxanylalkyl acrylate or methacrylate recurring unit;
a fluorine containing recurring unit;
a styrene containing recurring unit; and
a crosslinking unit.

10. The hybrid lens blank of claim 9, wherein the hydrogel comprises:
about 65 to about 75 mol % dimethylacrylamide recurring units;
about 25 to about 30 mol % tris(trimethylsiloxy)silylpropyl methacrylate recurring units;
about 0.2 to about 0.6 mol % 1,1,1,3,3,3-Hexafluoroisopropyl methacrylate recurring units;
about 1.5 to about 2 mol % styrene recurring units, and
about 1 to about 2 mol % ethyleneglycol dimethacrylate recurring units,
wherein the amount of each of the foregoing recurring units is on the basis of the total number of moles of recurring units in the hydrogel.

11. The hybrid lens blank of claim 1, wherein the skirt portion comprises a polymeric material that comprises one or more recurring units selected from linear (siloxanyl)alkyl (meth)acrylates, branched (siloxanyl)alkyl (meth)acrylates, cyclic (siloxanyl)alkyl (meth)acrylates, silicone-containing (meth)acrylates, fluorine-containing (meth)acrylates, hydroxyl group containing (meth)acrylates, (meth)acrylic acid, N-(meth)acryloylpyrrolidone, (meth)acrylamides, aminoalkyl (meth)acrylates, alkoxy group-containing (meth)acrylates, aromatic group containing (meth)acrylates, glycidyl (meth)acrylate, tetrahydrofurfuryl (meth)acrylate, silicone-containing styrene derivatives, fluorine-containing styrene derivatives, styrene derivatives, and vinyl monomers.

12. The hybrid lens blank of claim 1, wherein the diluent is selected from the group consisting of L-lactide, di-t-butyl-dicarbonate, tris(trimethylsilyl)amine, and 2,2,2-trifluoroacetamide.

13. The hybrid lens blank of claim 1, wherein the diluent is present in an amount sufficient to provide the skirt portion with an elastic modulus of at least about 3-14 kgf/cm2 after substantially full hydration.

14. The hybrid lens blank of claim 1, comprising about 5 to about 35 wt % of the diluent on the basis of the total weight of the skirt portion.

15. A xerogel polymer composition, comprising:
a vinyl amide recurring unit;
a polysiloxanylalkyl acrylate or methacrylate recurring unit;
a fluorine containing recurring unit;
a styrene containing recurring unit;
a crosslinking unit; and
a diluent comprising at least one selected from polylactic acid, polyglycolic acid, lactide, glycolide, a polyacetal, a cyclic acetal, a polyketal, a cyclic ketal, a polyorthoester, a cyclic orthoester, di-t-butyl-dicarbonate, tris(trimethylsilyl)amine, and 2,2,2-trifluoroacetamide.

16. The xerogel polymer composition of claim 15, wherein the polyorthoester comprises at least one selected from a methoxymethylene, an ethoxymethylene, a 1-(N,N-dimethylamino)ethylidene, a methanesulfonate and a toluenesulfonate.

17. The xerogel polymer composition of claim 15, wherein the cyclic orthoester comprises at least one selected from a methoxymethylene, an ethoxymethylene, a 1-(N,N-dimethylamino)ethylidene, a methanesulfonate and a toluenesulfonate.

18. The xerogel polymer composition of claim 15, wherein the polyketal comprises at least one selected from a methylene, a ethylidene and a 2,2,2-trichloroethylidene.

19. The xerogel polymer composition of claim 15, wherein the cyclic ketal comprises at least one selected from a methylene, a ethylidene and a 2,2,2-trichloroethylidene.

20. The xerogel polymer composition of claim 15, wherein the diluent is selected from the group consisting of L-lactide, Di-t-butyl-dicarbonate, Tris(trimethylsilyl)amine, and 2,2,2-Trifluoroacetamide.

21. The xerogel polymer composition of claim 15, comprising about 5 to about 35 wt % of the diluent on the basis of the total weight of the polymer.

22. The xerogel polymer composition of claim 15, wherein the composition forms at least a portion of a contact lens.

23. A xerogel polymer composition, comprising:
a polymer; and
a diluent dispersed within the polymer, wherein the diluent comprises at least one selected from polylactic acid, polyglycolic acid, lactide, glycolide, a polyacetal, a cyclic acetal, a polyketal, a cyclic ketal, a polyorthoester, a cyclic orthoester, di-t-butyl-dicarbonate, tris(trimethylsilyl)amine, and 2,2,2-trifluoroacetamide,
wherein the amount of diluent is selected so that upon substantially full hydration, the xerogel composition undergoes a linear expansion of less than approximately 8%.

24. The xerogel polymer composition of claim 23, wherein the polyorthoester comprises at least one selected from a methoxymethylene, an ethoxymethylene, a 1-(N,N-dimethylamino)ethylidene, a methanesulfonate and a toluenesulfonate.

25. The xerogel polymer composition of claim 23, wherein the cyclic orthoester comprises at least one selected from a methoxymethylene, an ethoxymethylene, a 1-(N,N-dimethylamino)ethylidene, a methanesulfonate and a toluenesulfonate.

26. The xerogel polymer composition of claim 23, wherein the polyketal comprises at least one selected from a methylene, a ethylidene and a 2,2,2-trichloroethylidene.

27. The xerogel polymer composition of claim 23, wherein the cyclic ketal comprises at least one selected from a methylene, a ethylidene and a 2,2,2-trichloroethylidene.

28. The xerogel polymer composition of claim 23, wherein the polymer comprises one or more recurring units selected from linear (siloxanyl)alkyl (meth)acrylates, branched (siloxanyl)alkyl (meth)acrylates, cyclic (siloxanyl)alkyl (meth)acrylates, silicone-containing (meth)acrylates, fluorine-containing (meth)acrylates, hydroxyl group containing (meth)acrylates, (meth)acrylic acid, N-(meth)acryloylpyrrolidone, (meth)acrylamides, aminoalkyl (meth)acrylates, alkoxy group-containing (meth)acrylates, aromatic group containing (meth)acrylates, glycidyl (meth)acrylate, tetrahydrofurfuryl (meth)acrylate, silicone-containing styrene derivatives, fluorine-containing styrene derivatives, styrene derivatives, and vinyl monomers.

29. The xerogel polymer composition of claim 23, wherein the polymer comprises:

about 65 to about 75 mol % dimethylacrylamide recurring units;

about 25 to about 30 mol % tris(trimethylsiloxy)silylpropyl methacrylate recurring units;

about 0.2 to about 0.6 mol % 1,1,1,3,3,3-Hexafluoroisopropyl methacrylate recurring units;

about 1.5 to about 2 mol % styrene recurring units;

and about 1 to about 2 mol % ethyleneglycol dimethacrylate recurring units;

each of the foregoing recurring units being on the basis of the total number of moles of recurring units in the polymer.

30. The xerogel polymer composition of claim 23, wherein the diluent is selected from the group consisting of L-lactide, di-t-butyl-dicarbonate, tris(trimethylsilyl)amine, and 2,2,2-trifluoroacetamide.

31. The xerogel polymer composition of claim 23, wherein the diluent is present in a concentration from about 5 to about 35 wt % on the basis of the total weight of the polymer.

32. The xerogel polymer composition of claim 23, wherein the composition forms at least a portion of a contact lens.

33. A hybrid contact lens, comprising:
a rigid center portion, comprising:
an acrylate recurring unit;
a styrene containing recurring unit;
a silicon containing recurring unit;
a fluorine containing recurring unit;
a cross-linking unit; and
an annular skirt portion coupled to the center portion at a junction between an outer peripheral edge of the center portion and an inner edge of the annular skirt portion, wherein the skirt portion comprises:
a vinyl amide recurring unit;
a polysiloxanylalkyl acrylate or methacrylate recurring unit;
a fluorine containing recurring unit;
a styrene containing recurring unit;
a cross-linking unit; and
a diluent dispersed within the skirt portion, wherein the diluent comprises at least one selected from polylactic acid, polyglycolic acid, lactide, glycolide, a polyacetal, a cyclic acetal, a polyketal, a cyclic ketal, a polyorthoester, a cyclic orthoester, di-t-butyl-dicarbonate, tris(trimethylsilyl)amine, and 2,2,2-trifluoroacetamide.

34. The hybrid lens of claim 33, wherein the polyorthoester comprises at least one selected from a methoxymethylene, an ethoxymethylene, a 1-(N,N-dimethylamino)ethylidene, a methanesulfonate and a toluenesulfonate.

35. The hybrid lens of claim 33, wherein the cyclic orthoester comprises at least one selected from a methoxymethylene, an ethoxymethylene, a 1-(N,N-dimethylamino)ethylidene, a methanesulfonate and a toluenesulfonate.

36. The hybrid lens of claim 33, wherein the polyketal comprises at least one selected from a methylene, a ethylidene and a 2,2,2-trichloroethylidene.

37. The hybrid lens of claim 33, wherein the cyclic ketal comprises at least one selected from a methylene, a ethylidene and a 2,2,2-trichloroethylidene.

38. The hybrid lens of claim 33, wherein the rigid center portion comprises one or more polymeric materials comprising recurring units selected from linear alkyl (meth)acrylates, branched alkyl (meth)acrylates, cyclic (meth)acrylates, silicone-containing (meth)acrylates, fluorine-containing (meth)acrylates, hydroxyl group containing (meth)acrylates, (meth)acrylic acid, N-(meth)acryloylpyrrolidone, (meth)acrylamides, aminoalkyl (meth)acrylates, alkoxy group-containing (meth)acrylates, aromatic group containing (meth)acrylates, silicone-containing styrene derivatives, fluorine-containing styrene derivatives, styrene derivatives, and vinyl monomers.

39. The hybrid lens of claim 33, wherein the rigid center portion comprises:
about 1 to about 10 mol % methacrylic acid recurring units;
about 2 to about 11 mol % 2,6-dichlorostyrene recurring units;
about 10 to about 55 mol % styrylethyl-tris(trimethylsiloxy)silane recurring units;
about 1 to about 10 mol % [1,1,3,3-tetrakis[(trimethylsilyl)oxy]-1,3-disiloxanediyl]di-3,1-propanediyl dimethacrylate recurring units,
about 1 to about 8 mol % 1,1,1,3,3,3-Hexafluoroisopropyl methacrylate recurring units;
about 5 to about 35 mol % 3-[3,3,3-Trimethyl-1,1-bis [(trimethylsilyl)oxy]disiloxanyl]propyl methacrylate recurring units; and
about 1 to about 8 mol % of a crosslinking unit selected from the group consisting of divinyl benzene, ethyleneglycol dimethyacrylate, and vinyl methacrylate,
each of the foregoing recurring units on the basis of the total number of mols of recurring units of the rigid portion.

40. The hybrid lens of claim 33, wherein the diluent is substantially removed during hydration of the skirt portion.

41. The hybrid lens of claim 33, wherein the diluent is selected from the group consisting of L-lactide, di-t-butyl-dicarbonate, tris(trimethylsilyl)amine, and 2,2,2-trifluoroacetamide.

42. The hybrid lens of claim 33, comprising about 5 to 35 wt % of the diluent on the basis of the total weight of the skirt portion.

43. A method for preparing a hybrid contact lens, the method comprising:
providing a substantially rigid center portion;
forming a peripheral skirt portion in the presence of the center portion, the skirt portion comprising a xerogel polymer and a diluent comprising at least one selected from polylactic acid, polyglycolic acid, lactide, glycolide, a polyacetal, a cyclic acetal, a polyketal, a cyclic ketal, a polyorthoester, a cyclic orthoester, di-t-butyl-dicarbonate, tris(trimethylsilyl)amine, and 2,2,2-trifluoroacetamide; and
machining at least the skirt portion to a selected shape while the diluent is present in the skirt portion.

44. The method of claim 43, further comprising hydrating the hybrid contact lens to substantially replace the diluent with water.

45. The method of claim 43, wherein the diluent is selected from the group consisting of L-lactide, di-t-butyl-dicarbonate, tris(trimethylsilyl)amine, and 2,2,2-trifluoroacetamide.

46. The method of claim 43, wherein the diluent is present in an amount sufficient to provide the skirt portion with an elastic modulus of at least about 3-14 kgf/cm2 after substantially full hydration.

47. The method of claim 43, comprising about 5 to about 35 wt % of the diluent on the basis of the total weight of the skirt portion.

48. The method of claim 43, wherein the skirt portion is bonded to the center portion using one of conventional organic reactions at about the junction between the two portions or plasma treatment of the junction.

* * * * *

UNITED STATES PATENT AND TRADEMARK OFFICE
CERTIFICATE OF CORRECTION

PATENT NO.        : 7,828,432 B2
APPLICATION NO.   : 11/754221
DATED             : November 9, 2010
INVENTOR(S)       : William E. Meyers et al.

It is certified that error appears in the above-identified patent and that said Letters Patent is hereby corrected as shown below:

At column 7, line 18, please delete "Method)"" and insert --Method,"--, therefor.

At column 9, lines 34-35, please delete "methacrylaterecurring" and insert --methacrylate recurring--, therefor.

At column 9, lines 39-40, please delete "methacrylaterecurring" and insert --methacrylate recurring--, therefor.

At column 10, line 58, please delete "1,1O-decanediol" and insert --1,10-decanediol--, therefor.

At column 10, line 59, please delete "1,1O-decanediol" and insert --1,10-decanediol--, therefor.

At column 11, line 65, please delete "lathing," and insert --lathing.--, therefor.

At column 16, line 15, please delete "units," and insert --units;--, therefor.

At column 16, line 23, please delete "dimethyacrylate," and insert --dimethacrylate,--, therefor.

Signed and Sealed this
Seventeenth Day of May, 2011

David J. Kappos
*Director of the United States Patent and Trademark Office*